(12) United States Patent
Pirhooshyaran et al.

(10) Patent No.: US 12,346,867 B1
(45) Date of Patent: Jul. 1, 2025

(54) SYSTEMS AND METHODS FOR INTELLIGENT DEFAULTING USING MACHINE LEARNING

(71) Applicant: Amazon Technologies, Inc., Seattle, WA (US)

(72) Inventors: Mohammad Pirhooshyaran, Seattle, WA (US); Jiang Du, Kirkland, WA (US); Taeuk Jang, West Lafayette, IN (US); Jonathan Toner, Bellingham, WA (US); Feng Zhu, Bothell, WA (US); Tian Chen, Redmond, WA (US); Ashish Satish Urankar, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/310,360

(22) Filed: May 1, 2023

(51) Int. Cl.
| | |
|---|---|
| *G06Q 10/08* | (2024.01) |
| *G06N 20/00* | (2019.01) |
| *G06Q 10/083* | (2023.01) |

(52) U.S. Cl.
CPC ........... *G06Q 10/083* (2013.01); *G06N 20/00* (2019.01)

(58) Field of Classification Search
USPC ......................................................... 705/330
See application file for complete search history.

(56) References Cited

U.S. PATENT DOCUMENTS

| | | | |
|---|---|---|---|
| 6,505,167 B1 * | 1/2003 | Horvitz ................ | G06Q 10/109 705/7.24 |
| 11,868,956 B1 * | 1/2024 | Dillon .................. | G06Q 10/087 |

(Continued)

FOREIGN PATENT DOCUMENTS

WO  WO-2017112369 A1 *  6/2017  ......... G06Q 30/0201

OTHER PUBLICATIONS

"Proximity-based single-tap meeting room selection," Dec. 12, 2017, IP.com Prior Art Database, the IP.com Journal, pp. 2-8. https://priorart.ip.com/IPCOM/000251972. (Year: 2017).*

*Primary Examiner* — Jeff Zimmerman
*Assistant Examiner* — Hunter Molnar
(74) *Attorney, Agent, or Firm* — Eversheds Sutherland (US) LLP

(57) ABSTRACT

Systems and methods for intelligent defaulting using machine learning are provided. The systems and methods may involve the use of one or more machine learning models that are used to determine a default shipment option to present to a user through a user interface associated with a product checkout page (for example, on a website or through a mobile device application). The determination of the default shipment option may be performed in two phases. A first phase may involve using user-specific historical data (for example, prior selected shipment options, order information, etc.) to determine scores associated with individual potential shipment options. The scores may indicate a probability that the user may select the individual shipment options. The individual shipment options may also be provided associated threshold values. A second phase may involve adjusting the thresholds based on non-user-specific factors, such as delivery driver preference, profits and other financial considerations, and other factors. A final shipment option may be selected by determining the highest probability score that satisfies its associated threshold. The default shipment option may be presented to the user by default when the user reached the checkout page for the product.

19 Claims, 7 Drawing Sheets

(56) References Cited

U.S. PATENT DOCUMENTS

2016/0189099 A1\* 6/2016 Iqbal ................. G06Q 30/0633
705/26.8
2023/0333860 A1\* 10/2023 Doreau ................ G06F 3/0482

\* cited by examiner

SYSTEMS AND METHODS FOR INTELLIGENT DEFAULTING USING MACHINE LEARNING

BACKGROUND

Sub-same-day (SSD) delivery is a delivery option that allows for prompt and timely delivery of products to users. SSD delivery offers multiple options for delivery windows within a day, including, for example, breakfast, brunch, lunch, dinner, and bedtime. Given these options, users can choose from multiple delivery windows based on their order time at a checkout page for a product (for example, a checkout page of a website, an application, etc.).

With the convenience it provides, SSD has been growing its delivery option share. As the demand surges, a better understanding of the user's preferences and the risk management between the user demand and capacity is critical. However, users are currently defaulted only to the fastest available time window without considering the user's preferences or the mismatching risk between demand and capacity. One lever to minimize the gap between demand and capacity is to shape the user demand by systematically defaulting to SSD windows at the checkout page.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depending on the context, encompass a plural number of such components or elements and vice versa.

DETAILED DESCRIPTION

This disclosure relates to, among other things, systems and methods for intelligent defaulting using machine learning. Defaulting is the process of recommending a ship option (SO) for each delivery group (DG) during an online checkout process. For example, a user may indicate they desire standard shipping, same-day shipping, SSD, overnight shipping, etc. The user may also indicate a preference for a time period during which they desire the delivery to be performed. The systems and methods may leverage one or more machine learning models to determine a default shipping option to display to a user completing a purchase of a product through an online platform, such as a website, an application, etc. Using the outputs of the machine learning models as a basis for determining the default option provides the benefit of mitigating instances in which users manually select an option other than the default option because the default option is undesirable for the user in general or under the specific circumstances of the current product purchase. While reference is made herein to determining and presenting a default shipping option, these same systems and methods may also be applicable in any other context in which default options may be automatically selected for a user.

In one or more embodiments, the intelligent defaulting may be performed using a two-step framework. In the first phase of the two-step framework, a neural network classifier (while reference is made to a neural network herein, any other type of machine learning or artificial intelligence in general may similarly be used) may be trained to predict user preferences. The first phase may involve first capturing historical data associated with prior user purchases (among other historical data) to identify user shipment intentions. The user data may be data for multiple users (however, in some cases, the user preferences may be specific to a single user as well). The neural network may be used to receive contextual features (including at least this historical data) as inputs and output prediction scores for the various shipment options. Objectives may also be formulated to optimize the user experience by reducing opt-out events (e.g., instances in which the user selects a shipment option other than the default option presented to the user). Thus, the first phase focuses on optimization focusing on user-specific data.

Figure 3A:
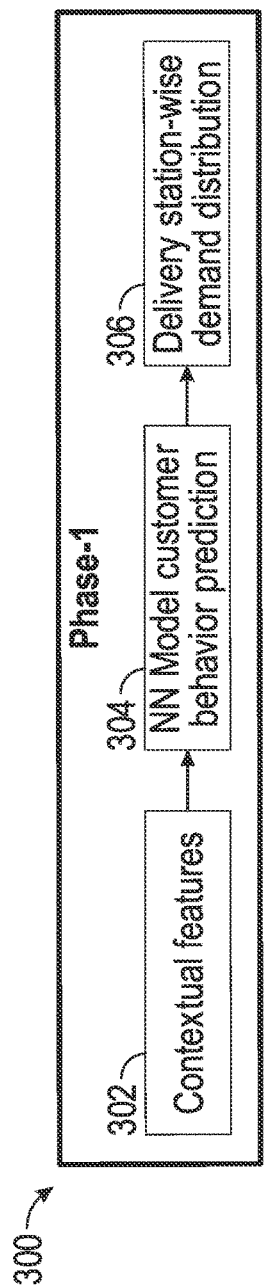
FIG. 3A depicts a flow diagram illustrating operations associated with a first phase of intelligent defaulting, in accordance with one or more example embodiments of the disclosure.
Figure 3B:
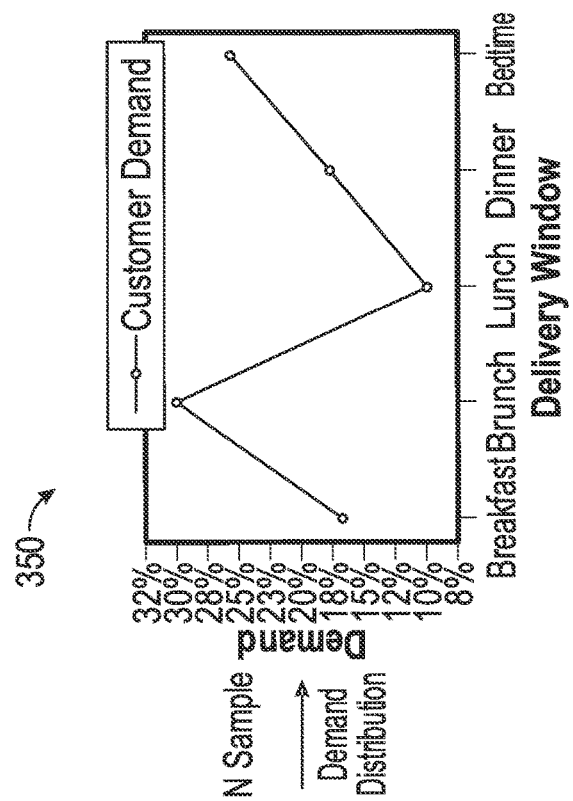
FIG. 3B depicts a demand distribution plot for the first phase of FIG. 3A, in accordance with one or more example embodiments of the disclosure.
Figure 3B:
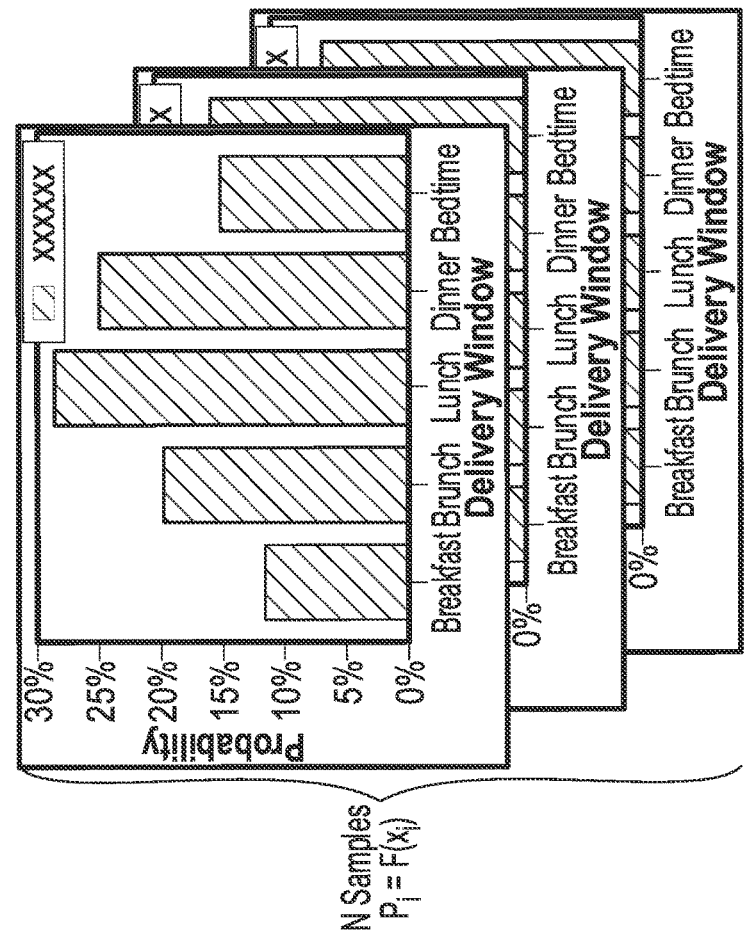

The output of the neural network classifier may include individual scores for some or all of the potential shipment options. A score may indicate a probability that a user is likely to select a particular shipment option as the actual shipment option to complete the online product purchase. For example, a score indicating a 60% likelihood that a user may select a same-day shipment option may be output by the neural network. More granular scores may also be generated, such as scores for individual time windows that the user may select from (for example, the user may select a morning time frame, an afternoon time frame, an evening time frame, specific delivery hours, etc.). FIGS. 3A-3B provide additional details about this first phase of the intelligent defaulting.

Additionally, one or more thresholds may be established for the different types of shipment options. That is, each of the scores may be compared to a threshold. Any scores that do not surpass the threshold associated with that particular shipment option may not be considered as an option for the default shipment option that is presented to the user. However, scores that do meet satisfy the associated threshold ("satisfy" may mean surpass, meet or surpass, etc.) may be considered as candidates for default shipment options.

Figure 4A:
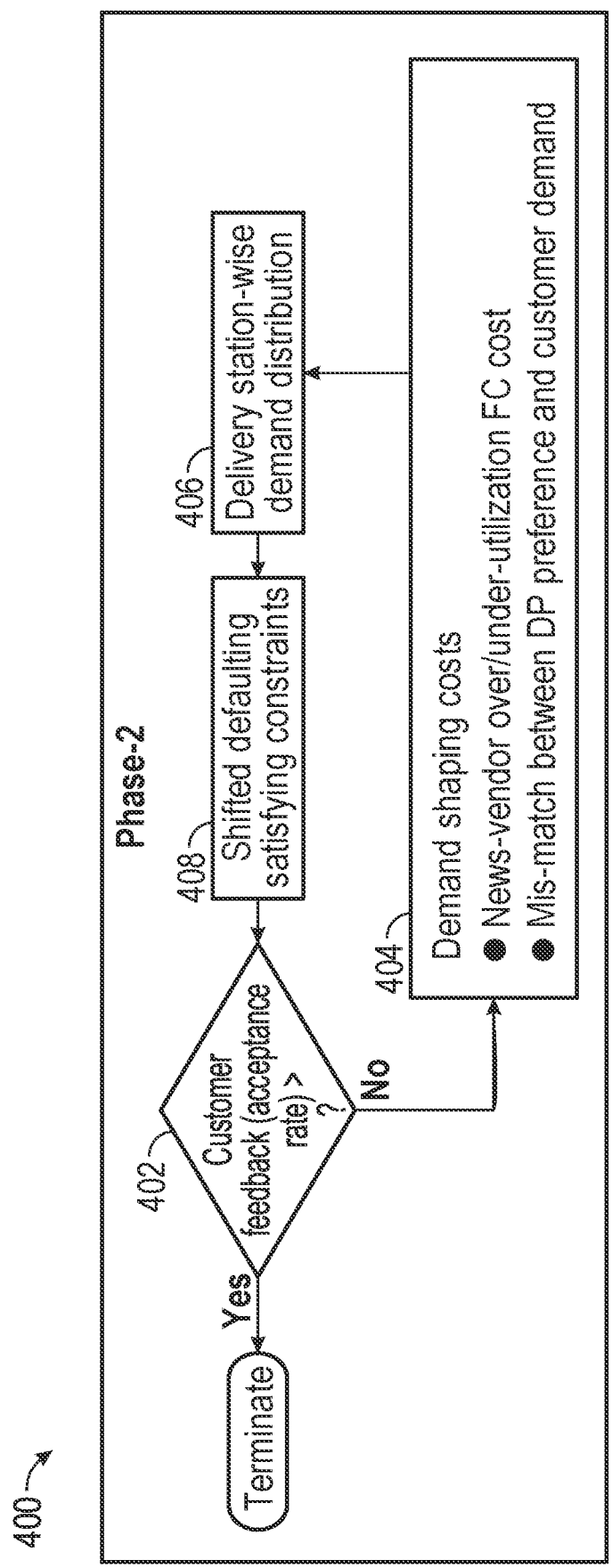
FIG. 4A depicts a flow diagram illustrating operations associated with a second phase of intelligent defaulting, in accordance with one or more example embodiments of the disclosure.
Figure 4B:
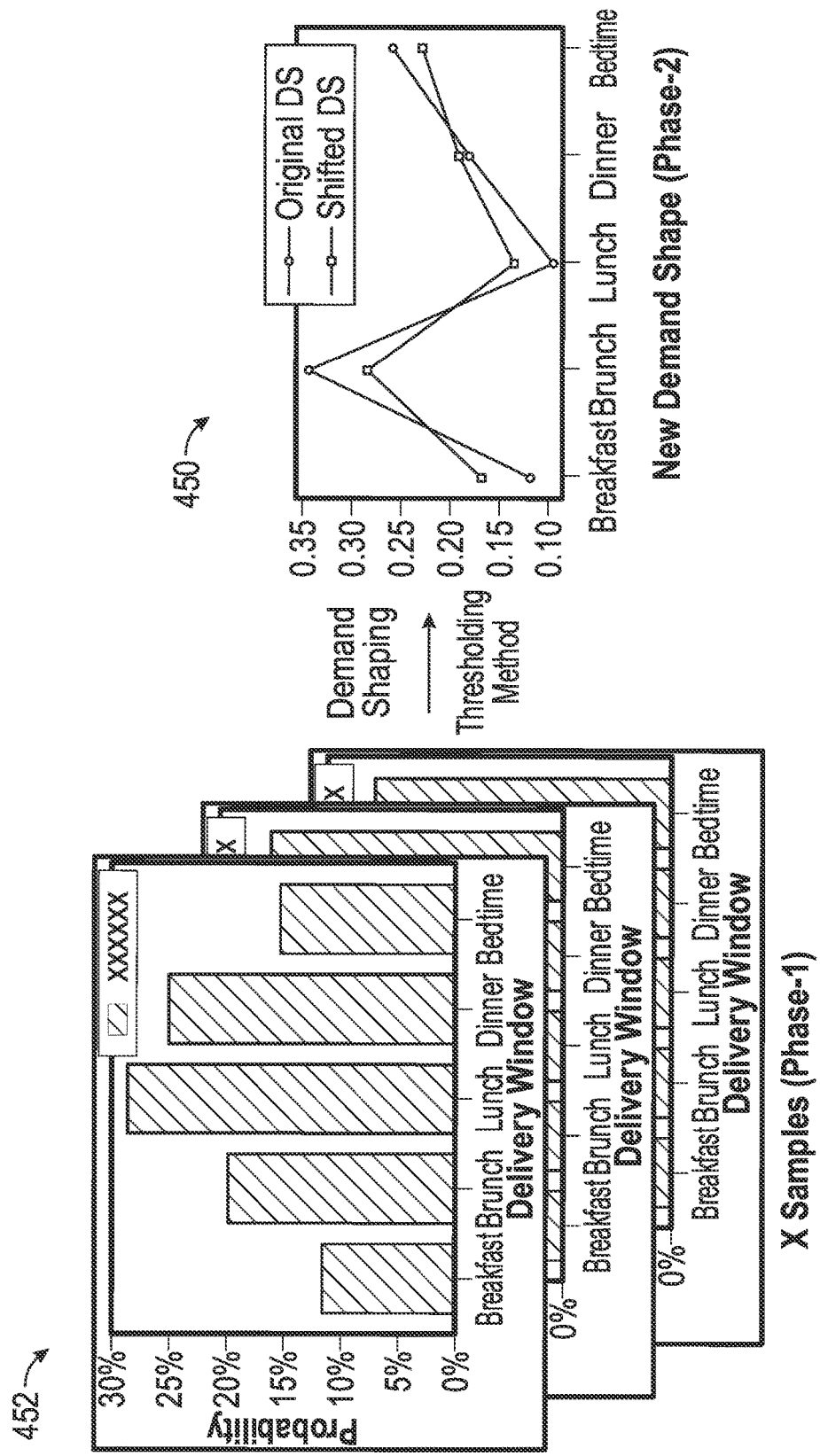
FIG. 4B depicts a demand distribution plot for the second phase of FIG. 4A, in accordance with one or more example embodiments of the disclosure.

In the second phase of the two-step framework, these thresholds may be adjusted based on non-user-specific factors (for example, any factors other than the historical user data). For example, the second phase may involve consideration of an optimization problem that includes benefits for the shipper, the delivery drivers, and other parties involved in the transaction (for example, accounting for delivery driver preferences, contribution profit, and shipping cost for the entity handling the transaction, etc.). Based on these considerations, adjusted thresholds and default option decisions may be generated. Once the adjusted thresholds are generated, the eligible shipment options may be ranked and a top shipment option (out of the candidate options that satisfy their associated thresholds) may be selected as the default option that is presented to the user at the checkout stage of the purchase process. FIGS. 4A-4B provide additional details about this second phase of the intelligent defaulting.

In some instances, the second phase may not involve any adjustments to the thresholds. For example, if a score associated with a particular shipment option exceeds a different threshold value (different than the thresholds used to determine which of the shipment options are candidates for selection as a default option), then that shipment option may be selected automatically as the default shipment option regardless of any factors normally considered in the second phase. This is because the probability value being above the threshold value is likely a strong indicator that the user will select the particular shipment option. In such cases, the thresholds may be maintained, and the intelligent defaulting may be performed based on the output of the first phase.

Once the thresholds and scores are finalized after the second phase, the default shipment option may be identified by comparing the scores generated through the first phase and/or the second phase for the individual shipment options. In certain embodiments, the score with the highest value that satisfies its associated threshold may be selected as the final default shipment option. However, this is not intended to be limiting, and the default shipment option may be determined in any other manner other than selecting the largest numerical value.

As an example, there may be three potential shipment options (a first option, a second option, and a third option). Based on the output of the two phases, the first option may be provided a score of 50 out of 100, the second option may be provided a score of 30 out of 100, and the third option may be provided a score of 20 out of 100. The first option may be associated with a threshold of 40, the second option may be associated with a threshold of 25, and the third option may be associated with a threshold of 25. That is, the thresholds for each of the shipment options may be different (however, some or all of the thresholds may also be the same in some cases as well). The use of this numerical value and potential range of values is exemplary. For example, in some cases, the scores may be normalized between values of zero and one such that the values sum to one.

In this example, the first and second options would be considered as candidate options for defaulting given that they satisfy their associated thresholds. However, the third option would not be considered because it does not satisfy its associated threshold. With the first and second options being candidate options, the final shipment option for presentation as the default option to the user may be selected by comparing the scores of the candidate options. In this case, the second option has a higher score than the first option, so the second option may be selected as the default option for presentation to the user.

Figure 1:
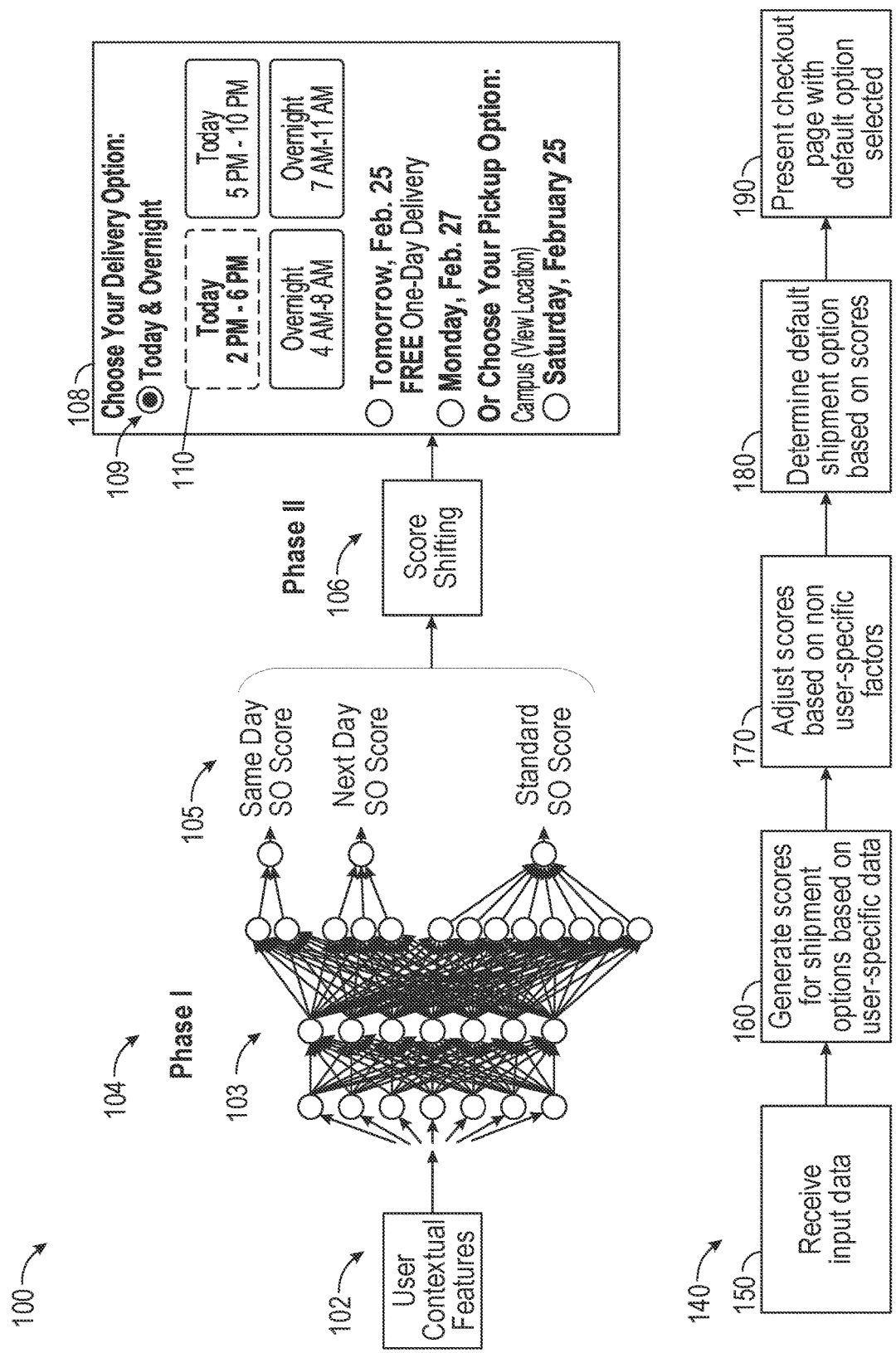
FIG. 1 depicts an example use case for intelligent defaulting, in accordance with one or more example embodiments of the disclosure.

Once the default shipment option is determined, when the shipment options are presented to the user via a user interface associated with a checkout page for the product, the default shipment option may be shown as automatically being selected among the listing of potential shipment options (for example, as shown in the portion of the user interface 108 of the use case 100 of FIG. 1). The user interface may still provide the capability for the user to select another shipment option from the list if the default shipment option selected is undesirable.

Demand shaping via cost-aware defaulting results in significant user experience improvements. For example, there may be a reduction in the number of manual clicks at checkout for the user, user cognitive load, and the average checkout time by providing the users with a customized default recommendation. The approach may also provide internal financial benefits to other parties involved in the transaction and may take into account delivery driver preferences and other factors as well.

Referring to FIG. 1, an example use case 100 for intelligent defaulting is depicted in accordance with one or more example embodiments of the disclosure. The use case 100 shows a portion of a user interface 108 that is presented to a user at an online checkout page. For example, the user interface 108 may be presented to a user through a website, mobile device application, and/or any other context in which products may be purchased online by the user. Specifically, the portion of the user interface 108 shows various shipping options that the user may select for shipment of the product being purchased online. Through defaulting, one of the shipment options is automatically presented to the user as being selected (e.g., the option may be automatically highlighted on the checkout page). For example, the fastest delivery option is selected by default in the use case 100. A more specific time window of today from 2-6 pm is also shown as selected through the highlighted box 110 below the radio button 109 for the shipment option. The intent of defaulting is to attempt to reduce the number of manual interactions the user needs to make with the user interface 108 to complete the purchase. However, conventional methods often simply involve defaulting to the fastest shipment method, regardless of the user intent or other factors. This approach may not necessarily reflect the actual intentions of the user and may also not consider other factors that may be involved, such as delivery driver preferences and costs incurred for other entities involved in the transaction.

To facilitate the prediction of the shipment option that the user is most likely to select, one or more machine learning models 103 may be used. As shown in the use case 100, the one or more machine learning models 103 may more specifically include one or more neural networks. However, while reference is made herein to neural networks, any other suitable type of artificial intelligence, machine learning, and the like may also be used. The one or more machine learning models 103 may represent a first phase 104 of a two-phase framework for the intelligent defaulting. The first phase 104 may involve generated scores 105 associated with the individual shipping options that are presented to the user. The scores 105 may represent the probabilities that a user is likely to select any of the shipment options at the online checkout page. The probabilities may be based on aggregated user data, such that the scores are based on data associated with multiple users. However, in some cases, the scores 105 may also be tailored to specific users (using data associated with that specific user) to reduce the likelihood that a particular user "opts-out" of a default shipment option (for example, a user selecting one of the options that is not the default selected shipment option determined by the one or more machine learning models).

To generate the scores for the various shipment options, the one or more machine learning models 103 may receive one or more user contextual features 102 as input data. The contextual features 102 may include real-time order-level features and historical customer-level features. For the order level features, item-related features may include price, quantity, category, gift option, promotion, the time of the order (e.g., min, hour, weekday, month). Order-level features may also include speed-related features such as different delivery times for different shipment options. Order-level features may also include merchant-related features like merchant type. Order-level features may also include location-related features like address type (e.g., apartment, single-family home), zip code, etc. For the user-level features, user historical ship option usage, shopping activities, device usage (e.g., mobile and PC, web browser or application, etc.) in recent time periods, along with tenure may be aggregated. The contextual features 102 may also include any other types of data.

As aforementioned, one or more thresholds may be established for the different types of shipment options. That is, each of the scores may be compared to a threshold. Any scores that do not surpass the threshold associated with that particular shipment option may not be considered as an option for the default shipment option that is presented to the user. However, scores that do satisfy the associated threshold ("satisfy" may mean surpass, meet, etc.) may be considered as candidates for default shipment options. In addition to the first phase 104 that generates the various scores 105 that are user-specific, the use case 100 may also involve a second phase 106. The second phase 106 may optionally adjust the thresholds to account for non-user-specific factors, such as shipment profits, among other factors. This second phase is described in additional detail in the flow diagram 140 and FIGS. 4A-4B.

To perform the intelligent defaulting, an example flow diagram 140 is presented and may be performed, for example, by one or more computing systems or devices (for example, user device 502, computing device 520, computing device 600, etc.). The one or more computing systems or devices may include at least one memory that stores computer-executable instructions and at least one processor configured to access the at least one memory and execute the computer-executable instructions to perform various actions or operations, such as one or more of the operations in the flow diagram 140 of FIG. 1. The flow diagram 140 is merely intended to provide a high-level example of the use of the one or more machine learning models to perform intelligent defaulting and is not intended to be limiting in any way.

First block 150 may involve receiving input data. The input data may include any of the contextual features 102, as well as any other types of relevant data described herein or otherwise. The contextual features 102 may include data associated with multiple users (or a single user, in some cases). Second block 160 may involve generating scores for shipment options based on user-specific data. A classification problem may be considered to predict the ground truth ship options $y^k$ chosen by the users at an online checkout page for a product. Given the contextual feature "x" as an input, a classifier "$f_\theta$" may be trained using trainable parameter "θ" that outputs scores (e.g., probability values) $\hat{p} \in R^{SO}$ and $y^k$ may be denoted as the window chosen by the users predicted by $f_\theta$.

Cross-entropy loss for a multi-classification problem may be considered as follows:

$$L_{cx}(x, \theta) = \frac{1}{|DG|} \sum_{dg \in DG} \left( \sum_{k \in K} y_{dg}^k * \log \hat{y}_{dg}^k \right)$$

Where "dg" is a delivery group instance of the set of all delivery groups DG={$dg_1$, $dg_2$, ... }, "k" is a delivery option among the set of all delivery options K={$k_1$, $k_2$ ... }, "$y_{dg}^k$" is a binary value that may only be a value of 1 when, for that dg, the $k^{th}$ label is the actual selected delivery option by customers (ground truth) and, $\hat{y}_{dg}^k$, is the soft-max probability of the $k^{th}$ delivery option recommended by the machine learning model. $L_{cx}$ reduces the mismatches between defaulting and user selection and thus reduces the opt-out rate as the primary CX metric.

In one or more embodiments, a deep neural network (DNN) and XGBoost may be used as the classifiers. DNN may provide a well-distributed output probability distribution. The output score from the classifier may be used to shape the demand with the thresholding approach in the second phase of the framework. Thus, evenly distributed outputs may be beneficial instead of an overconfident outcome to gradually and accurately shift the demand with thresholding. To further improve the granularity, gumbel softmax (GS) may be applied at the end of the neural network GS may be formulated as:

$$GS(x)_k = \frac{x_k/\tau}{\sum_n \exp\left(\frac{x_i}{\tau}\right)}$$

Where "$x_k$" is $k^{th}$ index of n-dimensional vector "x," and "τ" is a coefficient to adjust the sharpness of the output.

Third block 170 may involve adjusting the thresholds for the shipment options based on non-user-specific factors. The third block 170 may correspond to the second phase 106. In order to add financial considerations to the decision-making process, adjustable trainable variables may be introduced to the thresholds of the first phase. That is, to conduct demand shaping, trainable threshold adjustments $\phi \in R^{S*SO}$ may be introduced to the thresholds where S is the dimension of the loss functions and SO is the number of the labels.

By adding this thresholding variable to the output of the first phase, the user preference may be shifted. A one-hot encoder may not be used necessarily to calculate the shifted DS, since ¢ is optimized to minimize the objective functions that are introduced below. Thus, instead of using non-differentiable functions such as one-hot encoding, the one-hot encoder may be approximated by GS with τ<1. By its properties, GS with a small τ value may generate categorical sampling that resembles the one-hot vector and maintains the gradient that allows gradient descent optimization at the same time.

$L_f(\phi)$ may be considered as the objective function that focuses on internal financial benefits, and x is the feature set of smart defaulting including historical and run-time features and $\phi$ is the machine learning model parameters to learn.

$$L_I(\phi) = \frac{1}{|DG|} \sum_{dg \in DG} I(\hat{y}_{dg}, \phi)$$

Where "I" is the internal benefits prediction function that captures the defaulting effect. This value may include, for example, contribution profit, long-term OPS, etc. as follows:
$I(\hat{y}_{dg}, \phi) = \Sigma_{k \in K} I_k * I_k(\hat{y}_{dg}, \phi)$ Where k is a delivery option among the set of all delivery options K={$k_1, k_2 \ldots$}, "$I_k$" is an indicator (0-1 value), and $I_k$ is the internal profit prediction function for label k.

The objective function for the second phase may be finalized as:

$$L_f(.,\phi) = \lambda_{target}*L_{target} + \lambda_{utilization}*L_{utilization} + \lambda_{FL}*L_{FL} + \lambda_{reg}*\text{reg}(.)$$

Where "reg" is the regularization term that provides a trade-off between user preference and minimizing the cost.

In instances where a target demand shape DS* is provided by a business, DS can be directly optimized to minimize the distance between the target DS as:

$$L_{target} = \Sigma_s D(DS_S^*, \widetilde{DS}_s)$$

where D(•, •) is a distance metric between two probability distributions, e.g., categorical entropy, KL divergence, JS divergence, etc.

In some cases, there may be a mismatch between user demand and FC capacity. This may cause underused and overused windows to occur, resulting in a waste of resources and undesired expense. To mitigate this capacity-related risk, the utilization cost may also be introduced. To formulate the utilization costs, news-vendor modeling may be employed. In news-vendor modeling, the model is penalized if the demand exceeds a certain capacity for overutilization, and similarly, when demand is lower than a certain capacity, the model is penalized for underutilization.

In addition to the utilization cost, delivery driver cost may also be considered. That is delivery drivers may also have a preference for each window. If the user demand and delivery driver preference are imbalanced, additional incentives may need to be provided to encourage a delivery driver to engage in not preferred windows. Thus, aligning the user demand with delivery driver preference is another potential direction to reduce cost.

To quantify the delivery driver preference, behavioral discrete choice modeling (DCM) may be trained with delivery driver interactions with SSD offers on an application used by such delivery drivers. Given the information about hourly price, absolute window, day of the week, and exclusiveness of the options, DCM predicts the choice by delivery driver among the provided options in the application. As a result, DCM can ascertain why a particular delivery driver makes certain choices by realizing the sense of how DP values each utility feature as:

$\text{utility}_{dp} = w_{price}x_{price} + w_{win}x_{win} + w_{dow}x_{dow} + w_{exc}x_{exc}$ Where "w" is the learned weight for each utility.

Fourth block 180 may involve determining a default shipment option to present to a user at the online checkout page based on the adjusted thresholds generated through the third block 170 and the scores generated through the first phase. Finally, the fifth block may involve presenting the online checkout page with the default shipment option automatically being selected for the user (for example, as shown in the user interface 108 of the user case 100).

In one or more embodiments, a number of different feedback mechanisms may also be used to train the one or more machine learning models. An example feedback mechanism may involve identifying instances in which a default shipment option is presented to a user, and the user instead selects a different shipment option before placing the order. The indication that the user did not place the order with the default shipment option may be provided to the one or more machine learning models to train the one or more machine learning models to more effectively predict the likely shipment option that the user may select for future purchases. Other data may also be provided along with the indication that the user selected a shipment option other than the default shipment option, such as an indication of the shipment option that was instead selected, a delivery time frame selected by the user, the type of product being purchased, an indication of the merchant selling the product, and/or any other relevant contextual information that may provide an indication as to why the user selected the different shipment option.

As a part of the feedback mechanism, indications may also be provided to the one or more machine learning models when a user cancels an order and then proceeds to order the same product in a subsequent order. That is, the user may accidentally place an order with the default shipment option selected and then may cancel the order and select a different shipment option that is aligned with the actual shipment intentions of the user. This sequence of events may also provide an indication that the intelligent defaulting of the one or more machine learning models may not necessarily be selecting the most accurate default shipment option for the specific user given the circumstances of the order.

Figure 2:
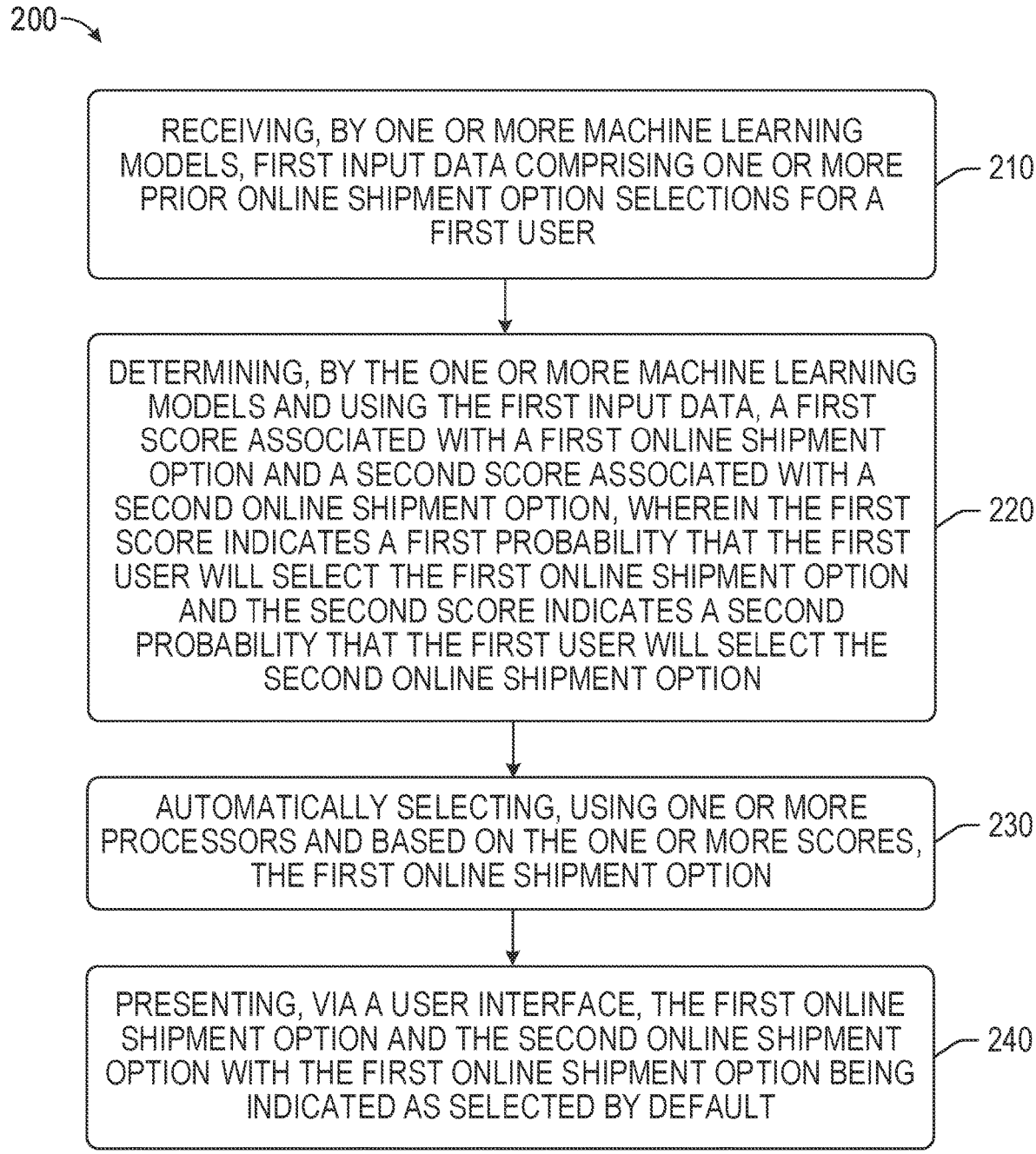
FIG. 2 depicts a method for intelligent defaulting, in accordance with one or more example embodiments of the disclosure.

FIG. 2 depicts an example method 200 for intelligent defaulting, in accordance with one or more example embodiments of the disclosure.

At block 210 of the process flow 200, computer-executable instructions stored on a memory of a system or device, such as user device 502, computing device 520, computing device 600, etc., may be executed to receive, by one or more machine learning models, input data comprising one or more prior online shipment option (the terms "shipment option" and "online shipment option" may be used interchangeably herein) selections for a user. The input data may include any of the input data described as being received in the first block 150 of the flow diagram. For example, the one or more machine learning models may consider user-specific information (such as data associated with multiple users and/or a single user), such as delivery address and/or any other information that is particular to the given user. The one or more machine learning models may also consider order information associated with the user(s), such as prior purchases and shipment options selected for those purchases, instances in which a user selected a shipment option other than a default shipment option, etc. The one or more machine learning models may also consider circumstantial data along with the order information to obtain insight into the impact of different circumstances on the shipment option selected by the user(s). For example, the input data may indicate a history of the user selecting a faster shipment option for a first type of product relative to a second type of product. As another example, the user may select a morning delivery window during certain days of the week. Any other number of potential factors may also influence the shipment option that is selected, and all of this information may be processed by the one or more machine learning models.

At block 220 of the process flow 200, the computer-executable instructions may be executed to determine, by the one or more machine learning models and using the input data, a first score associated with a first online shipment option and a second score associated with a second online shipment option, wherein the first score indicates a first probability that the user will select the first online shipment option, and the second score indicates a second probability that the user will select the second online shipment option. As a nonlimiting example, the first score may be associated with a same-day delivery shipment option, and the second score may be associated with a standard shipment option. Continuing the example, the first score may indicate a 40% probability that the user selects the first shipment option, and the second score may indicate a 30% chance that the user selects the second shipment option.

In addition to the first score and the second score, scores also may be generated for any other remaining shipment options from which the user may select. That is, the one or more machine learning models may generate scores indicating probabilities that the user is likely to select any of the different shipment options for a particular product purchase.

In one or more embodiments, the process flow 200 may also involve determining, based on one or more non-user-specific factors, an adjusted first threshold and an adjusted second threshold. Initially, the shipment option for which the first score is generated may be associated with a first threshold, and the shipment option for which the second score is generated may be associated with a second threshold. These thresholds may be adjusted in the second phase. That is, in addition to the first phase in which scores are generated using the machine learning model for the various shipment options based on predicted user preferences, a second phase may involve adjusting the thresholds to which the scores are compared, in some instances, based on non-user-specific factors (described in additional detail in at least FIGS. 1 and 4A-4B). Examples of non-user-specific factors may include delivery driver preference, and/or any other factors other than the preferences of the user placing the product order and selecting the shipment option.

At block 230 of the process flow 200, the computer-executable instructions may be executed to automatically select, using one or more processors and based on the one or more scores, the first online shipment option. The first online shipment option may be selected based on a comparison between the scores generated by the one or more machine learning models for the different shipment options. For example, the first online shipment option may be selected given that the probability that the user selects the first online shipment option is greater than the probability that the user selects the second online shipment option. Any of the shipment options that are selected as the default option may also need to satisfy their associated threshold value as well.

At block 240 of the process flow 200, the computer-executable instructions may be executed to present, via a user interface, the first online shipment option and the second online shipment option with the first online shipment option being indicated as selected by default. As shown in the user interface 108 of FIG. 1, when the user proceeds to a checkout page for a product during a product purchase process, a number of different shipment options may be presented to the user for selection. The user interface 108 shows radio buttons next to each shipment option that allow a user to select one of the shipment options for the product (however, any other type of selectable element may also be used in place of the radio button). The user interface 108 shows that the radio button associated with "today & overnight" shipment is selected by default. That is, in this example probability that the user selects the "today & overnight" shipment option is determined to be greater than the other potential shipment options.

The user interface 108 also shows various options associated with the "today & overnight" shipment option as well. For example, a user may select a particular time window during which they desire the delivery to be performed. This illustrates that the intelligent defaulting may produce more granular default shipment option determinations, including specific delivery time windows in addition to the delivery day shipment options.

FIG. 3A depicts a flow diagram 300 illustrating operations associated with a first phase of intelligent defaulting, in accordance with one or more example embodiments of the disclosure. The flow diagram 300 provides additional details relating to the general flow diagram 140 shown in FIG. 1 and the method 200 of FIG. 2.

At operation 302, input data may be received by one or more machine learning models. In one or more embodiments, the machine learning models may include one or more neural networks. The input data may include certain contextual features, which may include order-level features and user-level features.

The order-level features may include data that is specific to historical orders generated by a current user for which the intelligent defaulting is being performed. For the order level features, item-related features may include price, quantity, category, gift option, promotion, a time of the order (e.g., minute, hour, weekday, month). Order-level features may also include speed-related features such as different delivery times for different ship options. Order-level features may also include merchant-related features like merchant type. Order-level features may also include location-related features like address type (e.g., apartment, single-family home), zip code, etc.

The user-level features may include data that is specific to a given user. For example, the user-level features may include an indication of the number of times the user opted out of one particular shipment option and manually selected a different shipment option, as well as any other data. The user-level features may also include data associated with multiple users.

At operation 304, the one or more machine learning models may leverage the data received in operation 302 to predict user intentions. At operation 306, a demand distribution may be generated. That is, the one or more machine learning models may predict a particular shipment option that the user is most likely to select. The predictions may be made in general for any number of different types of products ordered under any number of given circumstances (for example, circumstances such as time of year, day of the week, time of day, type of product being purchased, etc.). The predictions may also specifically be made based on the circumstances surrounding the order being placed. In one or more embodiments, the output of the one or more machine learning models may include scores for each shipment option. The scores may indicate probabilities that a user is likely to select the particular shipment option at the online checkout page. For example, a score associated with a same-day-shipment option may be 50% and a score associated with standard delivery may be 15%. Scores may also be generated for specific time windows within the shipment options as well. The scores may also be provided in any other suitable format, such as numerical rankings, etc.

With respect to the user preference predictor model of the first phase, a classification problem may be considered to predict the absolute window "$y^a$" chosen by the user at the checkout page (for example, a checkout page on a website, an application, etc.) for a product purchase. Given the contextual feature x as an input, a classifier $f_\phi$ may be trained with trainable parameter $\phi$ that outputs scores (probability) $\hat{p} \in \mathbb{R}^{10}$ and $y^a$ may be denoted as the window chosen by the customers predicted by $f_\phi$. Here, the neural network may be employed as a classifier instead of models such as XGBoost because a well-distributed output probability distribution may be desirable. To be specific, the output score from the classifier may be leveraged to shape the demand with the thresholding approach in the second phase of the framework described with respect to FIG. 4A. Thus, evenly distributed outputs may be desirable instead of an over-confident outcome to gradually and accurately shift the demand with thresholding.

To further improve the granularity, gumbel softmax (GS) may be applied at the end of the neural network. Gumbel softmax is a generalization of the traditional softmax function formulated as:

$$GS(x)_k = \frac{x_k/\tau}{\sum_n \exp\left(\frac{x_i}{\tau}\right)},$$

Where $x_k$ is k-th index of n-dimensional vector "x," and "$\tau$" is a coefficient to adjust the sharpness of the output. If $\tau$ is small, the output may be similar to one-hot vector as it approaches a quantized categorical sample. Conversely, the output may be more evenly distributed and normalized when $\tau$ is large. In the first phase modeling, GS with $\tau=0.5$ may be used at the end to amplify the confidence of the neural network.

To train a classifier, cross-entropy loss may be minimized with optimization as shown below:

$$\min_\phi -\frac{1}{N}\sum_i\sum_k -e_k^{y_i^a}\log\hat{p}_{i,k},$$

Where $\hat{p}_{i,k}$ denotes the probability of k-th index of the output $f_\phi(x_i)$ for $k \in \{0, \ldots, 9\}$, and $e_k^{(\cdot)}$ denotes k-th index of one-hot encoding of the input.

FIG. 3B depicts a demand distribution plot 350 for the first phase of FIG. 3A, in accordance with one or more example embodiments of the disclosure. The demand distribution plot 350 shows aggregated demand for different delivery windows. The aggregated demand, for example, may be associated with any deliveries performed through a particular delivery station for any number of different users. FIG. 3B shows various data samples 352 associated with different users placing orders that are processed through the delivery station. The samples 352 include probability values associated with different delivery time windows. For example, a first sample 352 shows a probability of 15% for a "breakfast" delivery time window, 20% for a "brunch" delivery time window, 30% for a "lunch" delivery time window, 25% for a "dinner" delivery time window, and 15% for a "bedtime" delivery time window. These samples 352 may be aggregated to produce the demand distribution plot 350. In some instances, this aggregation may involve determining an average of the probabilities for the various delivery windows across the samples. However, other types of statistical values may also be used, such as mean and median. The demand distribution plot 350 may then be used during the second phase described with respect to FIGS. 4A-4B.

FIG. 4A depicts a flow diagram 400 illustrating operations associated with a second phase of intelligent defaulting, in accordance with one or more example embodiments of the disclosure. The flow diagram 400 provides additional details relating to the general flow diagram 140 shown in FIG. 1 and the method 200 of FIG. 2.

The second phase is an additional portion of the intelligent defaulting that accounts for factors beyond the intent of the user. That is, the second phase may attempt to balance the interests of the users with the interests of other entities and/or personnel involved in the shipment process. For example, the second phase may consider factors such as delivery driver preferences and total shipment cost and contribution profits. As another example, the second phase may consider policies of the entity that maintains control over the website and/or application through which the product purchase is performed, such as if the entity desires to promote an existing shipment option or a new type of shipment option. The second phase may also consider any other factors that are not necessarily specific to the user placing the purchase.

The output of the second phase may include adjusted thresholds. That is, variables may be introduced and optimized based on the various additional factors that are considered. The types of factors that are considered and the weight that the different factors are provided may also vary depending on conditions such as geographic region, time of year, the fulfillment center handling the order, the type of order (e.g., small dollar amount or large dollar amount), etc. The second phase may also not necessarily always adjust the scores produced by the first phase. For example, if the probability that the user desires to select a specific shipment option is greater than a threshold value (as determined through condition 402 described below), then that shipment option may be selected as the default to present to the user regardless of any additional factors that may otherwise be considered during the second phase.

The flow diagram 400 begins with condition 402, which involves a determination as to whether a score associated with a particular shipment option generated through the first phase exceeds a threshold value (this may be a different threshold than the thresholds used to determine candidate shipment options). If so, then the outputs of the first phase are maintained, and the default shipment option may be selected as the highest score shipment option generated through the first phase. Condition 402 is intended to account for scenarios where a user is exceedingly likely to select a particular shipment option, so that shipment option is defaulted rather than considering other factors (which may adjust the scores and result in a different shipment option being selected as the default, which may be undesirable for the user). As a nonlimiting example, condition 402 may be satisfied if the probability that a user selects a particular shipment option is 80% or greater (any other threshold may be used). If condition 402 is not met, then the flow diagram 400 proceeds to the second phase, including at least operations 404, 406, and 408.

Operation 404 involves cost constraint demand shaping. In the second phase of the intelligent defaulting, based on the output of the user preference predictor $f_\phi$ of the first phase, a threshold parameter "$\theta$" may be learned to shift the output of $f_\phi$ to satisfy diverse costs and risks. First, the demand shape (DS) of the users may be defined as:

$$DS = \mathbb{E}_D[e^{y^a}]$$

Where "$e^{(\cdot)}$" is a one-hot encoder that outputs a vector with the same dimension as the input, which may have one for the index with the maximum value among all dimensions and zero for all other indices. DS indicates the probability density function of the actual preference by the users. The DS of a particular product fulfilment center (FC) may also be denoted as:

$$DS_S = \mathbb{E}_{D_S}[e^{y^a}]$$

Where "s" denotes a FC. From the output of the first phase, the DS at a station "s" may be predicted as:

$$\widetilde{DS_S} = \widetilde{\mathbb{E}\mathcal{D}}_S[e^{\tilde{y}^a}]$$

To conduct demand shaping, the trainable threshold variable $\theta \in \mathbb{R}^{S \times 10}$ may be introduced, where S is the number of FC of interest. By adding this thresholding variable to the output of the first phase, the user preference values may be adjusted. For example, the predicted label of an instance may be adjusted from FC "s" by adding the corresponding threshold as:

$$\tilde{y}^a = \tilde{p} + \theta_s + m$$

Where $\theta_s \in \mathbb{R}^{10}$ denotes the threshold for a certain FC "s" and $m \in \mathbb{R}^{10}$ is a mask to filter out infeasible window. The mask "m" adds large negative values to the infeasible windows to prevent the second phase from shifting to the infeasible windows. The feasible windows may include the maximum number of different shipment options that may be recommended to a user at a checkout page. For example, an order made at 12 PM may filter out options earlier than the afternoon of the same day and later than afternoon (D+1).

Unlike computing $\widetilde{DS}_S$, a one-hot encoder may not necessarily be used to calculate the shifted DS, since $\theta$ may be optimized to minimize the objective functions. Thus, instead of using non-differentiable function $e^{(\cdot)}$, the one-hot encoder may be approximated by GS with $\tau \ll 1$. By its properties, GS with very small $\tau$ may generate categorical sampling that resembles the one-hot vector and maintains the gradient that allows gradient descent optimization at the same time. Here, $\tau = 0.01$ may be used to maintain a one-hot approximation while achieving stable optimization. Thus, DS shifted at the second phase of the FCs can be formulated as:

$$\widetilde{DS}_S = \mathbb{E}_{D_S}[GS_{\tau=0.01}(\tilde{y}^a)] \approx \mathbb{E}_{D_S}[e^{y^a}]$$

The costs that are taken into account may be introduced to find the optimal threshold e by minimizing them.

In the scenario where the target demand shape DS* is known, DS may be directly optimized to minimize the distance between the target DS as:

$$\mathcal{L}_{target} = E_S D(DS_S^*, \widetilde{DS}_S)$$

Where "D(•, •)" is a distance metric between two probability distributions, e.g., categorical entropy, KL divergence, JS divergence, etc. For example, the normalized preference score of delivery partners (DP) that represents the preference of DP on each window at each station that sums to one may be used. Therefore, minimizing $\mathcal{L}_{target}$ may reduce incentive expenses by satisfying DP preferences and reducing nonpreferred window allocation. However, it may be likely that DS* is unidentified. Thus, more concrete costs may be generated in more general scenarios.

From the historical data, it may be observed that there exists a mismatch between user demand and FC capacity. This may result in the underused and overused windows that occur causing waste of resources and undesired expense. To mitigate this capacity-related risk, utilization cost may also be introduced in the second phase. To formulate the utilization costs, news-vendor modeling may be used. In news-vendor modeling, the model is penalized if the demand exceeds a certain capacity for overutilization, and similarly, when demand is lower than a certain capacity, the model is penalized for underutilization.

To set the reference capacity for utilization costs with news-vendor modeling, risk management may be considered through real time capacity to provide the best user experience. After estimating the real time capacity, a risk flag (such as tiny red button (TRB), for example) may be used to manage the capacity risk. In some cases, the risk flag may be triggered if more than a threshold amount (for example, 95%) of the capacity is used. The risk flag may cease to be used when the capacity falls below the threshold value (or a different threshold value, such as 90%). Thus, in this example, the range between 90% and 95% utilization of the capacity is defined as the well-utilized region; however, any other range may also be used.

To compute the station and window-level utilization cost, each entry of $C_s$ and demand $\tilde{D}_S$ may be compared to examine over and underutilization. Here, demand $\tilde{D}_S$ may be denoted as: $\tilde{D}_S = \Sigma_{N_S}[GS_{\tau=0.01}(\tilde{y}_i^a)]$ Where Ns is the number of delivery group in station "s" and $\tilde{D}_S$ may be understood as the non-normalized demand shape of $\widetilde{DS}_S$. The capacity may be on a daily basis and may have five dimensions, i.e., $C_S \in \mathbb{R}^5$. Accordingly, the demand $\widetilde{DS}_S$ may be merged to five dimensions by not considering the rollover. To formulate utilization cost with news-vendor modeling, the window of that station may be penalized if the demand goes above 95% of the capacity for overutilization and may also be penalized when it goes below 90% for under-utilization. Thus, 0.95 and 0.90 may be multiplied to the capacity in over and underutilization cost, respectively, as:

$$\mathcal{L}_{over} = \Sigma_S \mathbb{1} * \max(D_S - C_S * 0.95, 0)$$

$$\mathcal{L}_{under} = \Sigma_S \mathbb{1} * \max(C_S * 0.9 - \tilde{D}_S, 0)$$

Where $\mathbb{1} \in \mathbb{R}^5$ denotes the one vector to sum every window element. Similarly, for window-level utilization, the demand and capacity may be summed up for all stations and examine the over and underutilization as:

$$\mathcal{L}_{over,win} = \max(\Sigma_S \tilde{D}_S - \Sigma_S C_S * 0.95, 0)$$

$$\mathcal{L}_{under,win} = \max(\Sigma_S C_S * 0.9 - \Sigma_S \tilde{D}_S, 0)$$

Then the overall utilization cost is the sum of the four terms above as:

$$\mathcal{L}_{utilization} = \mathcal{L}_{over} + \mathcal{L}_{under} + \mathcal{L}_{over,win} + \mathcal{L}_{under,win}$$

For simplicity, a uniform weight may be provided for each term. However, this can be generalized to different weights for each term for specific needs.

Apart from the utilization cost, delivery driver cost may also be considered. To be specific, delivery drivers may have a preference for each window. If the user demand and delivery driver preference are imbalanced, incentives may need to be provided to encourage delivery driver to engage in nonpreferred windows. Thus, aligning the user demand with delivery driver preference is another potential direction to reduce the cost.

To quantify the delivery driver preference, behavioral discrete choice modeling (DCM) may be trained with delivery driver interactions with SSD offers on the mobile application. Given the information about hourly price, absolute window, day of week, and exclusiveness of the options, DCM predicts the choice by delivery driver among the provided options in a mobile device application. As a result, DCM may ascertain why delivery driver makes certain choices by realizing the sense of how delivery driver values each utility feature such as:

$$utility_{DP} = w_{price} x_{price} + w_{win} x_{win} + w_{dow} x_{dow} + w_{exc} x_{exc}$$

Where w is learned weight for each utility.

Based on the pretrained DCM, the cost matrix Fs of a station "s" may be generated as:

$$F_s = \begin{bmatrix} 0 & a_{01} & a_{02} & a_{03} & a_{04} \\ -a_{01} & 0 & a_{12} & a_{13} & a_{14} \\ -a_{02} & -a_{12} & 0 & a_{23} & a_{24} \\ -a_{03} & -a_{13} & -a_{23} & 0 & a_{34} \\ -a_{04} & -a_{14} & -a_{24} & -a_{34} & 0 \end{bmatrix}$$

For some real value $a_{ij}$ for $i, j \in \{0, \ldots, 4\}$. The cost matrix indicates dollar saving by moving a unit of a delivery group from a window i to another window j. To calculate per unit cost saving, the original coefficient may be divided by delivered packages per hour (DPPH) for each station as the original $x_{price}$ is the hourly price.

To calculate the cost, the shift matrix of a station "s" may be denoted as $\tilde{M}_S$, where $\tilde{M}_S$ has the same dimension as $F_s$ and the element $\tilde{M}_{s,ij}$ indicates the number of instances that are shifted from window i to shifted j by DSF. Given the cost matrix Fs and the shift matrix $\tilde{M}_S$, the gain and loss of shifting instances from one window to another may be tracked as:

$$\mathcal{L}_{flex} = \Sigma_S F_S \odot \tilde{M}$$

Where "⊙" is element-wise multiplication.

Subsequently, the objective function for the second phase may be finalized as:

$$\mathcal{L}_\theta = \lambda_{target} \mathcal{L}_{target} + \lambda_{utilization} \mathcal{L}_{utilization} + \lambda_{flex} \mathcal{L}_{flex} + \lambda_{reg} reg(\theta)$$

Where reg is the regularization term that provides a tradeoff between customer preference and minimizing the cost. If the regularization weight is large, the output of the first phase (for example, as described with respect to at least FIGS. 3A-3B) may be maintained, which indicates that the user preferences are maintained. In contrast, if the weight is small, the demand may be shifted more aggressively to reduce the aforementioned costs.

To accommodate a realistic scenario in which a user may not necessarily use a default selected shipment option, an acceptance rate (AR) may be introduced into the modeling to flexibly adapt to user reactions to the default shipment option that is determined. To implement the acceptance rate, the output of DSF may be revised in the training process as:

$$\tilde{y}_i^a = \begin{cases} \hat{p} + \theta_s + m & \text{with probability of } AR \\ y_i^a & \text{with probability of } 1 - AR \end{cases}$$

where $0 \leq AR \leq 1$ is the probability that a customer accepts the new defaulting. For sufficient granularity, a set of thresholds $\{\theta_{AR=0.1}, \theta_{AR=0.2}, \ldots, \theta_{AR=1}\}$ with different acceptance rate may be obtained.

At inference, θ may be initialized to pretrained θ with a high AR, i.e., $\theta_{AR=1}$. Then for every certain time frame, the actual acceptance rate $AC_{actual}$ may be computed by comparing the actual choice by the customers and the window suggested by DSF. If the disparity between $AR_{actual}$ and $AR_{exp}$ is larger than 0.1, $AR_{exp}$ and threshold $\theta_{ARexp}$ may be updated by 0.1 toward the direction of $A_{actual}$. For example, $\theta_{AR}$ may be initialized with a value of 1 and θ may be updated periodically (such as every hour). After an hour, $AR_{actual}$ may be 0.4. Then, $AR_{exp}$ may be set to 0.9 θ may be set to $\theta_{AR}=0.9$ for the next hour. $AR_{exp}$ may be changed gradually instead of directly using the exact value, i.e., $AR_{exp}=0.4$, given the uncertainty about the actual user response to a different threshold. Thus, the threshold may be changed gradually until it converges.

At operation 406, delivery station-wise demand distribution may be determined. FIG. 4B depicts demand distribution plots for the second phase of FIG. 4A, in accordance with one or more example embodiments of the disclosure. For example, demand distribution plot 450 based on the samples 452 (which may be the same as samples 352 from the first phase) may be adjusted based on the thresholding of the second phase described with respect to FIG. 4A. Finally, at operation 408, the thresholds produced by the first phase may be shifted as aforementioned.

Figure 5:
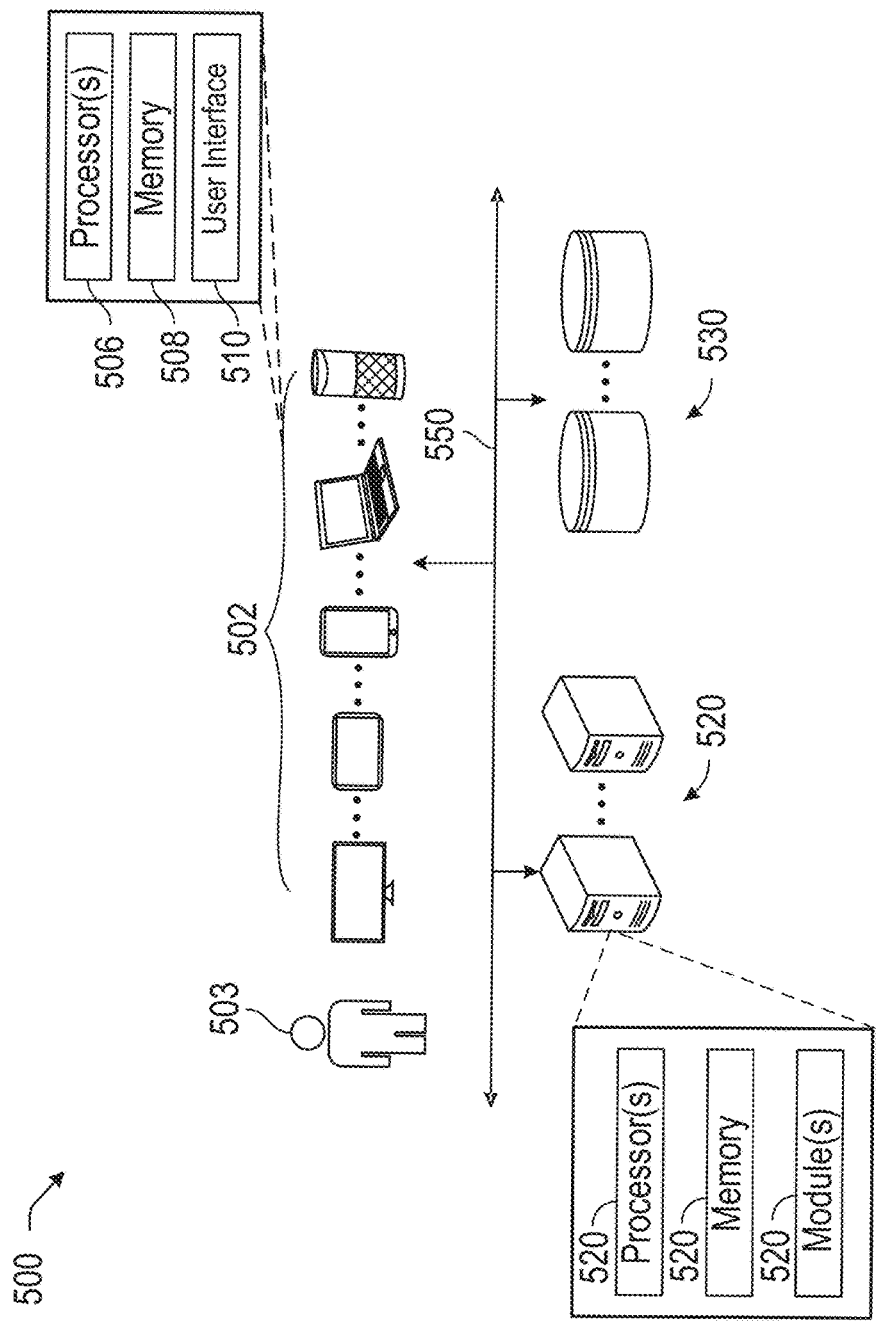
FIG. 5 depicts a system for intelligent defaulting, in accordance with one or more example embodiments of the disclosure.

FIG. 5 is an example system 500 for intelligent defaulting in accordance with one or more example embodiments of the disclosure. In one or more embodiments, the system may include one or more user devices 502 (which may be associated with one or more users 503), one or more computing devices 520, and/or one or more databases 530. However, these components of the system 500 are merely exemplary and are not intended to be limiting in any way. For simplicity, reference may be made hereinafter to a user device 502, computing device 520, database 530, etc.; however, this is not intended to be limiting and may still refer to any number of such elements.

The user device 502 may be any type of device, such as a smartphone, desktop computer, laptop computer, tablet, and/or any other type of device. The user device 502 may be used by a user to access a website, application, etc. to view and/or purchase a product. A user interface 510 may be presented on the user device 502 that may provide information about the product, may allow the user to purchase the product, and/or may allow the user to select from one or more shipment options for delivery of the product to the user 503.

The computing device 520 may be any type of device or system (such as a local or remote server for example) used to perform any of the processing described herein (such as any of the processes described with respect to FIGS. 1-4B). For example, the computing device may host any of the machine learning models used to produce outputs associated with the first phase and/or second phase of the intelligent defaulting as described herein. Thus, some or all of the processing described herein may be performed at the computing device 520. The computing device 520 may also include one or more processors 506 and memory 508. Any of this processing may also be performed by the mobile device 502 and/or any other device or system described herein as well.

The database 530 may store any of the data that is used as described herein. For example, the database 530 may store any of the input data to the machine learning models as described herein or otherwise.

In one or more embodiments, any of the elements of the system 500 (for example, one or more user devices 502, one or more computing devices 520, one or more databases 530, and/or any other element described with respect to FIG. 5 or otherwise) may be configured to communicate via a communications network 550. The communications network 550 may include, but is not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 550 may have any suitable communication range associated therewith and may include, for example, global networks (e.g., the Internet), metropolitan area networks (MANs), wide area networks (WANs), local area networks (LANs), or personal area networks (PANs). In addition, communications network 520 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements (for example, one or more user devices 502, one or more computing devices 520, and/or one or more databases 530) of the system 500 may include any of the elements of the computing device 600 as well.

Figure 6:
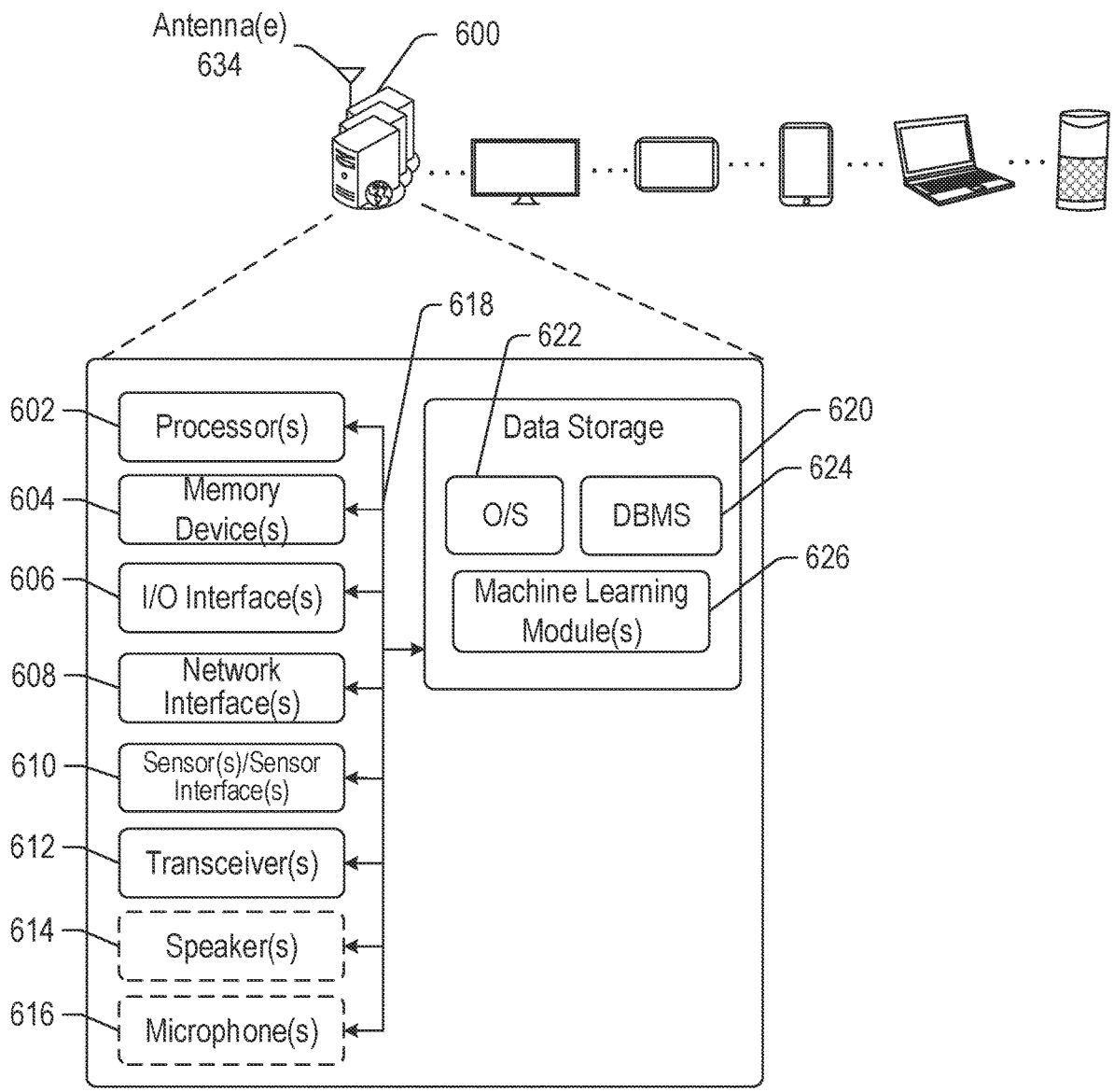
FIG. 6 depicts a computing device, in accordance with one or more example embodiments of the disclosure.

FIG. 6 is a schematic block diagram of an illustrative computing device 600 in accordance with one or more example embodiments of the disclosure. The computing device 600 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The computing device 600 may correspond to an illustrative device configuration for the devices of FIGS. 1-5 (for example, one or more user devices 502, one or more computing devices 520, etc.).

The computing device 600 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 600 may include one or more processor(s) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The computing device 600 may further include one or more buses 618 that functionally couple various components of the computing device 600. The computing device 600 may further include one or more antenna (e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the computing device 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the computing device 600 may include volatile memory (memory that maintains its state when supplied with power) such as random-access memory (RAM) and/or nonvolatile memory (memory that maintains its state even when not supplied with power) such as read-only memory (ROM), flash memory, ferroelectric RAM (FRAM), and so forth. Persistent data storage, as that term is used herein, may include nonvolatile memory. In certain example embodiments, volatile memory may enable faster read/write access than nonvolatile memory. However, in certain other example embodiments, certain types of nonvolatile memory (e.g., FRAM) may enable faster read/write access than certain types of volatile memory.

In various implementations, the memory 604 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multilevel cache organized as a hierarchy of one or more cache levels (L1, L2, etc.).

The data storage 620 may include removable storage and/or nonremovable storage including, but not limited to, magnetic storage, optical disk storage, and/or tape storage. The data storage 620 may provide nonvolatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604 and may ultimately be copied to data storage 620 for nonvolatile storage.

More specifically, the data storage 620 may store one or more operating systems (O/S) 622; one or more database management systems (DBMS) 624; and one or more program module(s), applications, engines, computer-executable code, scripts, or the like such as, for example, one or more machine learning module(s) 626. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the computing device 600. Any data stored in the data storage 620 may be loaded into the memory 604 for use by the processor(s) 602 in executing computer-executable code. In addition, any data depicted as being stored in the data storage 620 potentially may be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, purchase history information, user action information, user profile information, a database linking search queries and user actions, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the computing device 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the machine learning module(s) 626 may include computer-executable instructions, code, or the like that responsive to execution by one or more of the processor(s) 602 may perform functions including, but not limited to, performing any functionality associated with the first and second phase of the intelligent defaulting as described herein, such as determining and/or adjusting any of the scores associated with the various shipment options, as well as selecting a particular shipment option as a default shipment option for presentation to a user at a checkout page (and/or any other associated processes described herein).

Referring now to other illustrative components depicted as being stored in the data storage 620, the O/S 622 may be loaded from the data storage 620 into the memory 604 and may provide an interface between other application software executing on the computing device 600 and hardware resources of the computing device 600. More specifically, the O/S 622 may include a set of computer-executable instructions for managing hardware resources of the computing device 600 and for providing common services to other application programs (e.g., managing memory allocation among various application programs). In certain example embodiments, the O/S 622 may control execution of the other program module(s) to dynamically enhance characters for content rendering. The O/S 622 may include any operating system now known or which may be developed in the future including, but not limited to, any server operating system, any mainframe operating system, or any other proprietary or nonproprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 600 is a mobile device, the DBMS 624 may be any suitable lightweight DBMS optimized for performance on a mobile device.

Referring now to other illustrative components of the computing device 600, the input/output (I/O) interface(s) 606 may facilitate the receipt of input information by the computing device 600 from one or more I/O devices as well as the output of information from the computing device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port, or other connection protocol that may connect to one or more networks. The I/O interface(s) 606 may also include a connection to one or more of the antenna(s) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 600 may further include one or more network interface(s) 608 via that which the computing device 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(s) 634 may include any suitable type of antenna depending, for example, on the communications protocols used to transmit or receive signals via the antenna (e) 634. Nonlimiting examples of suitable antennas may include directional antennas, nondirectional antennas, dipole antennas, folded dipole antennas, patch antennas, multiple-input multiple-output (MIMO) antennas, or the like. The antenna(s) 634 may be communicatively coupled to one or more transceivers 612 or radio components to which or from which signals may be transmitted or received.

As previously described, the antenna(s) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 634 may additionally, or alternatively, include a Wi-Fi antenna configured to transmit or receive signals in accordance with established standards and protocols, such as the IEEE 802.11 family of standards, including via 2.4 GHZ channels (e.g., 802.11b, 802.11 g, 802.11n), 5 GHz channels (e.g., 802.11n, 802.11ac), or 60 GHz channels (e.g., 802.11ad). In alternative example embodiments, the antenna(s) 634 may be configured to transmit or receive radio frequency signals within any suitable frequency range forming part of the unlicensed portion of the radio spectrum.

The antenna(s) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 634—transmitting or receiving radio frequency (RF) signals in the bandwidth and/or channels corresponding to the communications protocols utilized by the computing device 600 to communicate with other devices. The transceiver(s) 612 may include hardware, software, and/or firmware for modulating, transmitting, or receiving—potentially in cooperation with any of antenna(s) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the computing device 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the computing device 600 may include alternate and/or additional hardware, software, or firmware components beyond those described or depicted without departing from the scope of the disclosure. More particularly, it should be appreciated that software, firmware, or hardware components depicted as forming part of the computing device 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for case of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as submodule(s) of another module, in certain embodiments, such module(s) may be provided as independent module(s) or as submodule(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be written initially in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not gener- That which is claimed is:

1. A method comprising:
receiving, by one or more machine learning models, first input data comprising one or more prior online shipment option selections performed via a user interface of a website by a first user;
determining, by a neural network classifier and using the first input data, a first score associated with a first online shipment option, a second score associated with a second online shipment option, and a third score associated with a third online shipment option, wherein the first score indicates a first probability that the first user will select the first online shipment option via the user interface of the website, the second score indicates a second probability that the first user will select the second online shipment option via the user interface of the website, and the third score indicates a third probability that the first user will select the third online shipment option via the user interface of the website, wherein the first online shipment option is associated with a first threshold, wherein the second online shipment option is associated with a second threshold, wherein the third online shipment option is associated with a third threshold, and wherein the first threshold, the second threshold, and the third threshold are different;
adjusting, using one or more processors and based on one or more non-user-specific factors, the first threshold to a fourth threshold, the second threshold to a fifth threshold, and the third threshold to a sixth threshold, wherein the fourth threshold, the fifth threshold, and the sixth threshold are different;
determining that the first score fails to satisfy the fourth threshold, the second score satisfies than the fifth threshold, and the third score satisfies the sixth threshold;
comparing, based on determining that the second score satisfies than the fifth threshold and the third score satisfies the sixth threshold, the second score and the third score, wherein the first online shipment option is disregarded based on the first score failing to satisfy the fourth threshold;
determining that the second score is greater than the third score;
automatically selecting, using one or more processors and based on determining that the second score is greater than the third score, the second online shipment option via the user interface of the website; and
presenting, via the user interface of the website, the first online shipment option and the second online shipment option with the first online shipment option being indicated as selected by default.

2. The method of claim 1, further comprising:
receiving, via the user interface, a user selection of the second online shipment option instead of the automatically selected first online shipment option; and
training the one or more machine learning models based on the user selection of the second online shipment option.

3. The method of claim 1, wherein the first input data further comprises data relating to prior orders and comprises at least one of: price, quantity, product category, time of order, merchant type, and delivery location.

4. A method comprising:
receiving, by a neural network classifier, first input data comprising one or more prior online shipment option selections performed via a user interface of a website by a first user;
determining, by the neural network classifier and using the first input data, a first score associated with a first online shipment option and a second score associated with a second online shipment option, wherein the first score indicates a first probability that the first user will select the first online shipment option via the user interface of the website and the second score indicates a second probability that the first user will select the second online shipment option via the user interface of the website;
determining, based on user-specific factors, a first threshold associated with the first online shipment option and a second threshold associated with the second online shipment option, wherein the first threshold and second threshold are different;
adjusting, based on non-user-specific factors, the first threshold to a third threshold and the second threshold to a fourth threshold, wherein the third threshold and fourth threshold are different;
determining that the first score fails to satisfy the third threshold and the second score satisfies than the fourth threshold;
automatically selecting, using one or more processors and based on determining that the first score fails to satisfy the third threshold and the second score satisfies the fourth threshold, the first online shipment option via the user interface of the website; and
presenting, via the user interface of the website, the first online shipment option and the second online shipment option with the first online shipment option being indicated as selected by default.

5. The method of claim 4, wherein determining the third threshold and the fourth threshold further comprises adding a trainable variable to the first threshold and the second threshold.

6. The method of claim 4, further comprising:
receiving, by the neural network classifier, second input data comprising one or more prior online shipment option selections for a second user;
determining, by the neural network classifier and using the second input data, a third score associated with the first online shipment option and a fourth score associated with the second online shipment option, wherein the third score indicates a third probability that the second user will select the first online shipment option and the fourth score indicates a fourth probability that the second user will select the second online shipment option; and
determining, using the one or more processors, that the first score is greater than a fifth threshold value,
wherein automatically selecting the first online shipment option is performed without adjusting the fifth threshold and is based on the determination that the first score is greater than the fifth threshold.

7. The method of claim 4, wherein automatically selecting the first online shipment option is based on determining that the first score is greater than the second score.

8. The method of claim 4, wherein automatically selecting the first online shipment option is based on determining that the first score satisfies the first threshold.

9. The method of claim 4, further comprising:
receiving, via the user interface, a user selection of the second online shipment option instead of the automatically selected first online shipment option; and
training the neural network classifier based on the user selection of the second online shipment option.

10. The method of claim 4, wherein the first input data further comprises data relating to prior orders and comprises at least one of: price, quantity, product category, time of order, merchant type, and delivery location.

11. A system comprising:
memory that stores computer-executable instructions; and
one or more processors configured to access the memory and execute the computer-executable instructions to:
receive, by a neural network classifier, first input data comprising one or more prior online shipment option selections performed via a user interface of a website by a first user;
determine, by the neural network classifier and using the first input data, a first score associated with a first online shipment option and a second score associated with a second online shipment option, wherein the first score indicates a first probability that the first user will select the first online shipment option via the user interface of the website and the second score indicates a second probability that the first user will select the second online shipment option via the user interface of the website;
determine, based on user-specific factors, a first threshold associated with the first online shipment option and a second threshold associated with the second online shipment option, wherein the first threshold and second threshold are different;
adjust, based on non-user-specific factors, the first threshold to a third threshold and the second threshold to a fourth threshold, wherein the third threshold and fourth threshold are different;
determine that the first score fails to satisfy the third threshold and the second score satisfies than the fourth threshold;
automatically select, using one or more processors and based on determining that the first score fails to satisfy the third threshold and the second score satisfies the fourth threshold, the first online shipment option via the user interface of the website; and
present, via the user interface of the website, the first online shipment option and the second online shipment option with the first online shipment option being indicated as selected by default.

12. The system of claim 11, wherein determining the third threshold and the fourth threshold further comprises adding a trainable variable to the first threshold and the second threshold.

13. The system of claim 11, wherein the one or more processors are further configured to execute the computer-executable instructions to:
receive, by the neural network classifier, second input data comprising one or more prior online shipment option selections for a second user;
determine, by the neural network classifier and using the second input data, a third score associated with the first online shipment option and a fourth score associated with the second online shipment option, wherein the third score indicates a third probability that the second user will select the first online shipment option and the fourth score indicates a fourth probability that the second user will select the second online shipment option; and
determine, using the one or more processors, that the first score is greater than a fifth threshold value,
wherein automatically selecting the first online shipment option is performed without adjusting the fifth threshold and is based on the determination that the first score is greater than the fifth threshold.

14. The system of claim 11, wherein automatically selecting the first online shipment option is based on determining that the first score is greater than the second score.

15. The system of claim 11, wherein automatically selecting the first online shipment option is based on determining that the first score satisfies the first threshold.

16. The system of claim 11, wherein the one or more processors are further configured to execute the computer-executable instructions to:
receiving, via the user interface, a user selection of the second online shipment option instead of the automatically selected first online shipment option; and
training the neural network classifier based on the user selection of the second online shipment option.

17. The system of claim 11, wherein the first input data further comprises data relating to prior orders and comprises at least one of: price, quantity, product category, time of order, merchant type, and delivery location.

18. The method of claim 1, wherein adjusting the first threshold to the fourth threshold, the second threshold to the fifth threshold, and the third threshold to the sixth threshold further comprises:
determining a demand shape using gumbel softmax with a coefficient of a first value that is less than a value of one.

19. The method of claim 18, wherein determining the first score, second score, and third score further comprises:
applying a gumbel softmax at an end of the neural network classifier, wherein the gumbel softmax uses a coefficient with a second value that is within a range of 0.5 to 1.

* * * * *